Patented May 3, 1932

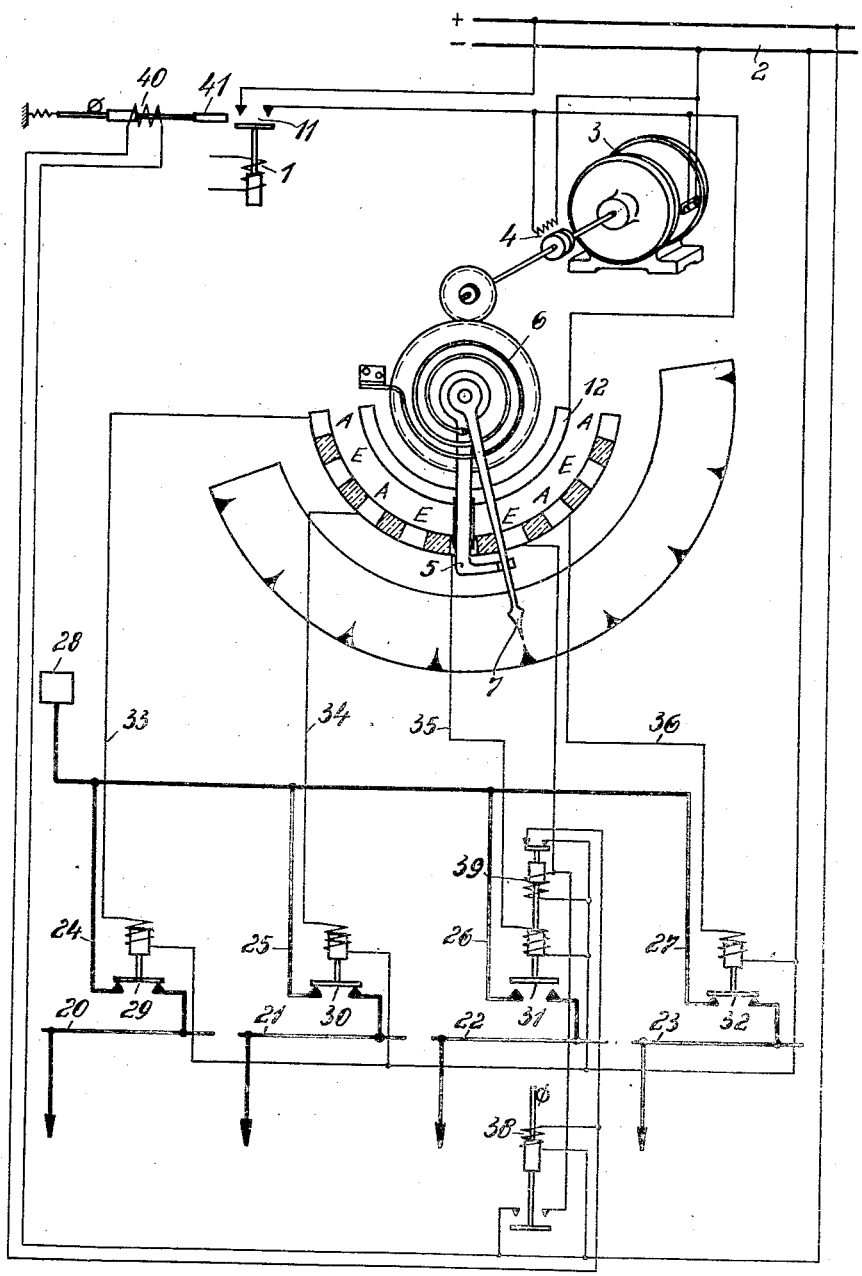

1,856,172

UNITED STATES PATENT OFFICE

ROBERT SCHIMPF, OF BERLIN-SCHLACHTENSEE, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

GROUND DETECTOR

Application filed August 23, 1930, Serial No. 477,455, and in Germany August 26, 1929.

My invention relates to improvements in ground detectors.

A ground detector device for the individual sections of an electric line system and controlled from a ground leakage supervising device is already known in the art. This detector cuts out and then in again successively each individual section and is provided with a device for automatically reclosing the faulty section which is after at least one response finally removed. That arrangement is intended for use in line systems not equipped with ground current compensating devices. In line systems with ground current compensating devices, the requirements are different because, in order to prevent damage, it is not necessary to cut out a section in which a ground has developed and persists. It has on the contrary become usual to keep the defective section in a system of the latter kind in service in spite of an existing ground until the fault can be removed.

This known ground detector device may, however, also be used to advantage in line systems with compensation of the ground current if the detector is not used for cutting out the faulty section but solely for indicating it. According to the present invention, this is achieved by causing, as soon as the faulty line is automatically cut in again, the ground leakage supervising relay to be locked in such a manner that the ground detector is prevented from operating, and therefore from disconnecting again the faulty section, even if the ground fault still exists after reconnecting the faulty section. For example, simultaneously with the responding of the device for reconnecting automatically the faulty section, a time-delay device can be made to operate, which inserts, between the time just before the reconnection of the faulty section and just after its reconnection, a piece of insulating material between the contacts of the ground leakage supervising relay.

If the ground relay then again responds owing to the persistence of the ground the piece of insulating material is tightly held by the contacts of the relay until the ground fault is removed. For this locking of the ground leakage supervising relay, the automatic time-delay relay controlling the reclosing may also be employed.

In the drawing an example of reducing my invention to practice is illustrated. 28 is the generator which supplies current to the feeders 24—27 of the system. The neutral point of this generator is grounded by way of a coil 50 of a ground compensator (not shown in detail) to which is connected a transformer 51 whose secondary delivers current to ground supervising relay 1 and energizes it when a ground exists at any point of the system. When the ground leakage supervising relay 1 responds to a ground in the system it closes its contacts 11. Thereby a motor 3 connected to an auxiliary source of current 2 is set in operation and drives the pointer 5 of the detector through a simultaneously energized magnetic clutch 4 and a reduction gear. The pointer 5 sweeps successively across the several opening and reclosing contacts, A and E respectively, for the oil circuit breakers of the individual sections of the system. The electric line system is indicated by its individual sections 20 to 23, which are supplied by feeders 24 to 27 from the generator 28. In the feeders are connected the pertaining automatic breakers 29 to 32, the tripping coils of which are connected through the lines 33 to 36 respectively to the opening contacts A of the detector. The connection of the closing contacts E of the detector with the pertaining reclosing coils of the circuit breakers, is similar for all sections and is shown only for the reclosing coil 39 of the circuit breaker 31 and its operation will be described presently.

When arm 5 sweeps successively over the opening and closing contacts, it successively opens but immediately recloses all sections encountered which are in sound condition, stopping only at the opening contact of a defective section as will be described later. For the purpose of describing the opening and closing of a sound section, let us first assume that the ground fault, which had started the arm 5 operating is in section 23, and that all preceding sections (20—22) are sound. They are opened and immediately closed successively as will now be described with reference to section 22. As soon as arm 5 arrives on the opening contact A for section 22, the opening coil 49 is energized by way of circuit: +2, contacts 11, segment 12, brushes 15, line 35, coil 49,—2. Breaker 31 opens and disconnects section 22 from feeder 26. The ground not being removed by this opening, ground relay 1 remains energized and arm 5 continues travelling to the right until it arrives on the closing contact E for section 22. When breaker 31 opens, its relay bar encounters with its detent 46 a pawl 45 pivoted at 47 and constituting one of the armatures of closing coil 39. This pawl 45 locks breaker 31 in open position. As soon as arm 5 arrives on the closing contact E as aforementioned, coil 39 is connected by the arm to source 2 through line 48. When coil 39 is thus energized, it immediately attracts pawl 45, thereby unlocking breaker 31, and then, by pulling in its core connected to the breaker bar, recloses the breaker and thus reconnects sound section 22 to its feeder.

If the detector arm 5 in sweeping on encounters finally a contact A pertaining to a section in which a ground prevails, this section is cut out in the same manner as described before. But by thus also removing the ground, ground relay 1 is deenergized and opens contacts 11, the motor 3 stops and the magnetic coupling 4 is disengaged. The pointer 5 snaps back to the left into its position of rest under the action of a spring 6.

The main pointer 5 on its travel over the contacts takes along a drag pointer 7 which stops at the section contact where a ground has developed and thus indicates the defective section.

Since for simplifying the showing, all relays and circuits are shown in detail only for section 22, let us now assume that the ground has occurred in section 22, and that detector relay 1 is energized and has closed contacts 11, and started arm 5 from left to right. As soon as this arm has reached the position shown in the drawing, a circuit is closed, commencing at the positive pole of the auxiliary source of current 2 and passing through the contacts 11 of the ground relay 1, the segment-shaped contact piece 12, the brushes 15 of the main pointer 5 and the trip coil of the breaker 31 which disconnects section 22 from feeder 26 as aforedescribed. The ground being thereby removed from the system for the time being, ground relay 1 opens its contacts 11, clutch 4 is deenergized, and arm 5 returns to the left to its position of rest, as previously described, but leaves drag pointer 7 behind, to indicate the defective section. Through an auxiliary contact 42 operated by breaker 31, and which is closed when the breaker is tripped as shown, the time-delay relay 38 controlling the automatic reclosing is energized directly from source 2 and closes its contacts after a certain length of time, whereby the switching-in coil 39 is energized by way of + pole of source 2, switch 44, coil 39, — pole of source 2, and closes the breaker. If, as it is often the case, the ground has been removed by this temporary cutting out of the faulty section, the ground relay would not respond again, and the detector arm 5 consequently remains in the position of rest at the left ready for action when another ground occurs. Should on the contrary the ground still persist then the detector must be prevented from again operating and thereby cutting off the faulty section. To obtain this a further time-limit relay 40 is employed, which is excited simultaneously with the time-limit relay 38 when the breaker is tripped and which introduces during the time just before the reconnection of the faulty section and just after its removal a piece of insulating material 41 between the contacts 11 of the ground relay 1. If after the reclosing of the faulty section the ground fault is cured, the armature of relay 40 is returned to its position of rest by spring 43, because its excitation circuit is reopened at switch 42. Should, however, the trouble still persist after the reclosing of the faulty section, then the ground relay 1 responds again, whereby the piece of insulating material 41 is held tightly between the contacts 11 of the ground relay. By these means the detector is prevented from operating arm 5 anew in the manner described. When later on the ground has been removed by repairs the ground relay reopens and frees the piece of insulation 41, so that the armature of the time-delay relay 40 returns to its position of rest through the action of spring 43. A further manner of simplifying the arrangement would be to omit the time-limit relay 40 and to let the time-limit relay 38, which controls the automatic reclosing, perform the insertion of the insulating material into contacts 11 of the ground relay 1 in the same manner as relay 40.

I claim as my invention:

1. In a ground detecting device for ground compensated sectionalized electric power distribution systems in combination, a ground supervising relay responsive to a ground in the system, a ground testing device having means for successively disconnecting and reconnecting the line sections, and being controlled by said ground relay to operate so long as the latter responds to a ground, means for each section independent of said testing device and responsive when the section is open, for reconnecting a disconnected grounded section after a desired time period, and means cooperative with said independent means for blocking the ground relay control of said testing device if the ground of the reconnected section persists.

2. In a ground detecting device for ground compensated sectionalized electric power distribution systems in combination, a ground supervising relay responsive to a ground in the system, a ground testing device having means for successively disconnecting and reconnecting the line sections, and being controlled by said ground relay to operate so long as the latter responds to a ground, means for each section independent of said testing device and responsive when the section is open, for reconnecting a disconnected grounded section after a desired time period, and means cooperative with said independent means for blocking the ground relay control of said testing device if the ground of the reconnected section persists, said blocking means being engageably disposed with respect to said ground relay to be held by the latter in blocking position so long as said relay responds to the ground of the reconnected section.

3. In a ground detecting device for ground compensated sectionalized electric power distribution systems in combination, a switch for each line section and a disconnecting and a reconnecting device for each switch, a ground supervisor responsive to a ground in the system, an automatic switching device actuated by said supervisor on its response to a ground, and adapted to successively actuate the section disconnecting devices including a grounded section, and the section reconnecting devices excluding the grounded section. a separate control device for each reconnecting device, actuated independent of said switching device when the pertaining section is grounded and having means for energizing the reconnection device of the grounded section and means actuated simultaneously with said control device for blocking the reactuation of said switching device by said ground supervisor when the ground persists after reconnection of the grounded section.

4. In a ground detecting device for ground compensated sectionalized electric power distribution systems in combination, a switch for each line section and a disconnecting and a reconnecting device for each switch, a ground supervisor responsive to a ground in the system, an automatic switching device actuated by said supervisor on its response to a ground, and adapted to successively actuate the section disconnecting devices including a grounded section, and the section reconnecting devices excluding the grounded section, a separate control device for each reconnecting device, actuated independent of said switching device when the pertaining section is grounded, and having means for energizing the reconnection device of the grounded section after a desired time period, and means actuated simultaneously with said control device for blocking the reactuation of said switching device by said ground supervisor when the ground persists after reconnection of the grounded section.

5. In a ground detecting device for ground compensated sectionalized electric power distribution systems in combination, a switch for each line section and a disconnecting and a reconnecting device for each switch, a ground supervisor responsive to a ground in the system, an automatic switching device actuated by said supervisor on its response to a ground, and adapted to successively actuate the section disconnecting devices including a grounded section, and the section reconnecting devices excluding the grounded section, a separate control device for each reconnecting device, actuated by the open section switch independent of said switching device when the pertaining section is grounded, and having means for energizing the reconnecting device of the grounded section after a desired time period, and means simultaneously actuated by the open section switch, for blocking the reactuation of said switching device by said ground supervisor when the ground persists after reconnection of the grounded section.

6. In a ground detecting device for ground compensated sectionalized electric power distribution systems in combination, a switch for each line section and a disconnecting and a reconnecting device for each switch, a ground supervisor responsive to a ground in the system, an automatic switching device actuated by said supervisor on its response to a ground, and adapted to successively actuate the section disconnecting devices including a grounded section, and the section reconnecting devices excluding the grounded section, a separate control device for each reconnecting device, actuated independent of said switching device when the pertaining section is grounded, and having means for energizing the reconnection device of the grounded section after a desired time period, and means actuated simultaneously with said control device for blocking the reactuation of said switching device by said ground supervisor when the ground persists after reconnection of the grounded section, said supervisor having means for holding said blocking means in blocking position so long as the supervisor responds to a ground of the reconnected grounded section.

7. In a ground detecting device for ground compensated sectionalized electric power distribution systems in combination, a switch for each line section and a disconnecting and a reconnecting relay for each switch and an auxiliary current source and circuit connections with said relays, a ground relay responsive to a ground in the system, an automatic switching device operated by said auxiliary source for successively controlling the circuits for energizing the section switch disconnecting and reconnecting relays of the line sections, a control switch for said switching device operated by said ground relay for actuating said switching device on and during the relay response to a ground, whereby the switching device stops at a disconnected grounded section due to the discontinuation of the ground relay response, a retarded circuit control relay for each reconnecting relay, energized from said auxiliary source in the open position of the pertaining section switch, independent of said switching device, for energizing after a desired time period the reclosing relay of a grounded section to reconnect the latter, an insulating element interposable between the contact elements of said ground relay-operated control switch, and means energized simultaneously with said retarded control relay for interposing said insulating element to block the closing of the control switch by its ground relay when the latter responds to a ground reestablished by the reconnected grounded section, said insulating element being held in blocking position by said ground relay so long as the latter responds to the reestablished ground.

8. In a ground detecting device for ground compensated sectionalized electric power distribution systems in combination, a switch for each line section and a disconnecting and a reconnecting relay for each switch and an auxiliary current source and circuit connections with said relays, a ground relay responsive to a ground in the system, an automatic switching device operated by said auxiliary source for successively controlling the circuits for energizing the section switch disconnecting and reconnecting relays of the line sections, a control switch for said switching device operated by said ground relay for actuating said switching device on and during the relay response to a ground, whereby the switching device stops at a disconnected grounded section due to the discontinuation of the ground relay response, a retarded circuit control relay for each reconnecting relay, energized from said auxiliary source in the open position of the pertaining section switch, independent of said switching device, for energizing after a desired time period the reclosing relay of a grounded section to reconnect the latter, an insulating element interposable between the contact elements of said ground relay-operated control switch, and a retarded relay energized simultaneously with said retarded control relay for interposing said insulating element to block the closing of the control switch by its ground relay when the latter responds to a ground reestablished by the reconnected grounded section, said insulating element being held in blocking position by said ground relay so long as the latter responds to the reestablished ground.

In testimony whereof I affix my signature.

ROBERT SCHIMPF.